United States Patent
Cochrane et al.

(10) Patent No.: US 6,763,352 B2
(45) Date of Patent: Jul. 13, 2004

(54) INCREMENTAL MAINTENANCE OF SUMMARY TABLES WITH COMPLEX GROUPING EXPRESSIONS

(75) Inventors: Roberta Jo Cochrane, Los Gatos, CA (US); Wolfgang Lehner, San Jose, CA (US); Mir Hamid Pirahesh, San Jose, CA (US); Richard Sefton Sidle, Mountain View, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/453,982

(22) Filed: Dec. 2, 1999

(65) Prior Publication Data

US 2003/0093407 A1 May 15, 2003

Related U.S. Application Data

(60) Provisional application No. 60/135,277, filed on May 21, 1999.

(51) Int. Cl.$^7$ ............................................. G06F 17/30
(52) U.S. Cl. ............................. 707/4; 707/7; 707/201
(58) Field of Search ............................. 707/2, 3, 100, 707/8, 4, 7, 201

(56) References Cited

U.S. PATENT DOCUMENTS

| | | | | |
|---|---|---|---|---|
| 5,930,795 A | * | 7/1999 | Chen et al. ................ | 707/100 |
| 5,991,754 A | * | 11/1999 | Raitto et al. ................ | 707/2 |
| 6,081,801 A | * | 6/2000 | Cochrane et al. ............ | 707/3 |
| 6,339,769 B1 | * | 1/2002 | Cochrane et al. ............ | 707/2 |
| 6,353,828 B1 | * | 3/2002 | Ganesh et al. ............... | 707/8 |
| 6,484,159 B1 | * | 11/2002 | Mumick et al. .............. | 707/2 |
| 6,546,402 B1 | * | 4/2003 | Beyer et al. ................. | 707/201 |

OTHER PUBLICATIONS

B. S. Mumick, et al., "Maintenance of Data Cubes and Summary Tables in a Warehouse", SIGMOD '97, AZ, USA, Apr. 1997, pp. 100–111.

* cited by examiner

*Primary Examiner*—Charles Rones
(74) *Attorney, Agent, or Firm*—Richard M. Ludwin; Marc D. McSwain

(57) ABSTRACT

A method, apparatus, and article of manufacture for the incremental maintenance of summary tables with complex grouping expressions where the change (insert/delete/update) of a single row of the base data can affect multiple rows in the summary table. The invention applies the complex grouping expression to the raw delta, yielding a delta stream consisting of multiple (but distinct) grouping combinations. The invention then inserts/deletes/updates delta values into/from the existing summary table so that each grouping combination of the delta stream modifies its corresponding grouping combination in the summary table.

19 Claims, 9 Drawing Sheets

| | $A_i$ IS NOT NULLABLE | | $A_i$ IS NULLABLE | |
|---|---|---|---|---|
| | $G_i$ NOT SPECIFIED | $G_i$ SPECIFIED | $G_i$ NOT SPECIFIED | $G_i$ SPECIFIED |
| $A_i$ NOT INVOLVED IN A COMPLEX GROUPING EXPRESSION | $\delta.A_i = \tau.A_i$ | | $(\delta.A_i = \tau.A_i)$ OR $(\delta.A_i$ IS NULL AND $\tau.A_i$ IS NULL) | |
| $A_i$ INVOLVED IN A COMPLEX GROUPING EXPRESSION | $(\delta.A_i = \tau.A_i)$ OR $(\delta.A_i$ IS NULL AND $\tau.A_i$ IS NULL) | $((\delta.A_i = \tau.A_i)$ OR $(\delta.G_i = 1))$ AND $(\delta.G_i = \tau.G_i)$ | NOT APPLICABLE | $(\delta.A_i = \tau.A_i)$ OR $(\delta.A_i$ IS NULL AND $\tau.A_i$ IS NULL) AND $(\delta.G_i = \tau.G_i)$ |

|  | $A_i$ IS NOT NULLABLE | | $A_i$ IS NULLABLE | |
| --- | --- | --- | --- | --- |
|  | $G_i$ NOT SPECIFIED | $G_i$ SPECIFIED | $G_i$ NOT SPECIFIED | $G_i$ SPECIFIED |
| $A_i$ NOT INVOLVED IN A COMPLEX GROUPING EXPRESSION | $\delta.A_i = \tau.A_i$ | $\delta.A_i = \tau.A_i$ | $(\delta.A_i = \tau.A_i)$ OR $(\delta.A_i$ IS NULL AND $\tau.A_i$ IS NULL) | $(\delta.A_i = \tau.A_i)$ OR $(\delta.A_i$ IS NULL AND $\tau.A_i$ IS NULL) |
| $A_i$ INVOLVED IN A COMPLEX GROUPING EXPRESSION | $(\delta.A_i = \tau.A_i)$ OR $(\delta.A_i$ IS NULL AND $\tau.A_i$ IS NULL) | $((\delta.A_i = \tau.A_i)$ OR $(\delta.G_i = 1))$ AND $(\delta.G_i = \tau.G_i)$ | NOT APPLICABLE | $(\delta.A_i = \tau.A_i)$ OR $(\delta.A_i$ IS NULL AND $\tau.A_i$ IS NULL) AND $(\delta.G_i = \tau.G_i)$ |

*FIG. 5*

INCREMENTAL MAINTENANCE OF SUMMARY TABLES WITH COMPLEX GROUPING EXPRESSIONS

CROSS REFERENCE TO RELATED APPLICATIONS

This application is a related to co-pending and commonly-assigned U.S. provisional patent application: S/No. 60/135,277, entitled "Incremental Maintenance of Aggregated Join Summary Tables", filed on May 21, 1999, which is incorporated by reference herein as if printed in full below.

BACKGROUND OF THE INVENTION

1. Field of the Invention

This invention relates in general to database management systems performed by computers, and in particular, to the incremental maintenance of summary tables with complex grouping expressions.

2. Description of Related Art

Computer systems incorporating a Relational Database Management System (RDBMS) using a Structured Query Language (SQL) interface are well known in the art. The SQL interface has evolved into a standard language for performing operations in an RDBMS and has been adopted as such by both the American Nationals Standard Organization (ANSI) and the International Standards Organization (ISO).

One application for an RDBMS is a data warehouse. The star schema of a typical data warehouse is comprised of a small number of very large fact tables and some number of relatively small dimension tables. The complex analytical queries that are evaluated in data warehouse environments often join one or more of the fact tables together with some dimension tables to pick up dimension attributes and then aggregate the results of these joins. A common characteristic of the data warehouse is that data from operational systems are periodically propagated to the warehouse. For example, bulk load append operations can be applied to the fact tables on a nightly basis. Old data can also be periodically purged from the fact tables via delete statements. Dimension tables are typically more static in nature and are updated less frequently.

The high volume of data in the warehouse requires that the number of fact table scans must be minimized. Materialized views (or automatic summary tables as they are known in DB2(r) UDB(tm)) are commonly used in data warehouses to help achieve this goal. Aggregated result sets that can be used in the computation of multiple queries are pre-computed and materialized in tables. Using complex grouping expressions for the definition of such materialized views imply that a single table can hold values aggregated according to multiple grouping combinations. The queries are then rerouted (either manually by rewriting the query or automatically by sophisticated query compilers) to refer to the materialized views rather than the base fact table data.

Materialized views with complex grouping expressions must be maintained efficiently to reflect the periodic updates to the data warehouse. Given the vast amount of data involved, there is a need in the art for efficient maintenance methods for materialized views with complex grouping expression. Moreover, there is a need in the art for maintenance methods that are incremental in nature to avoid full re-computation of the queries of the materialized views.

SUMMARY OF THE INVENTION

To overcome the limitations in the prior art described above, and to overcome other limitations that will become apparent upon reading and understanding the present specification, the present invention discloses a method, apparatus, and article of manufacture for incrementally maintaining a materialized view with complex grouping expressions derived from at least one base table in a database stored on a computer. In accordance with the method, subsequent to performing a modification to at least one base table in a transaction, a data stream is built comprising modifications to be propagated to the materialized view.

BRIEF DESCRIPTION OF THE DRAWINGS

Referring now to the drawings in which like reference numbers represent corresponding parts throughout:

FIG. 5 is a table showing all different combinations for the generation of the outer-join predicate for each single grouping attribute $A_i$ involved in the grouping expressions of a summary table;

DETAILED DESCRIPTION OF THE PREFERRED EMBODIMENT

Hardware Environment

Figure 1:
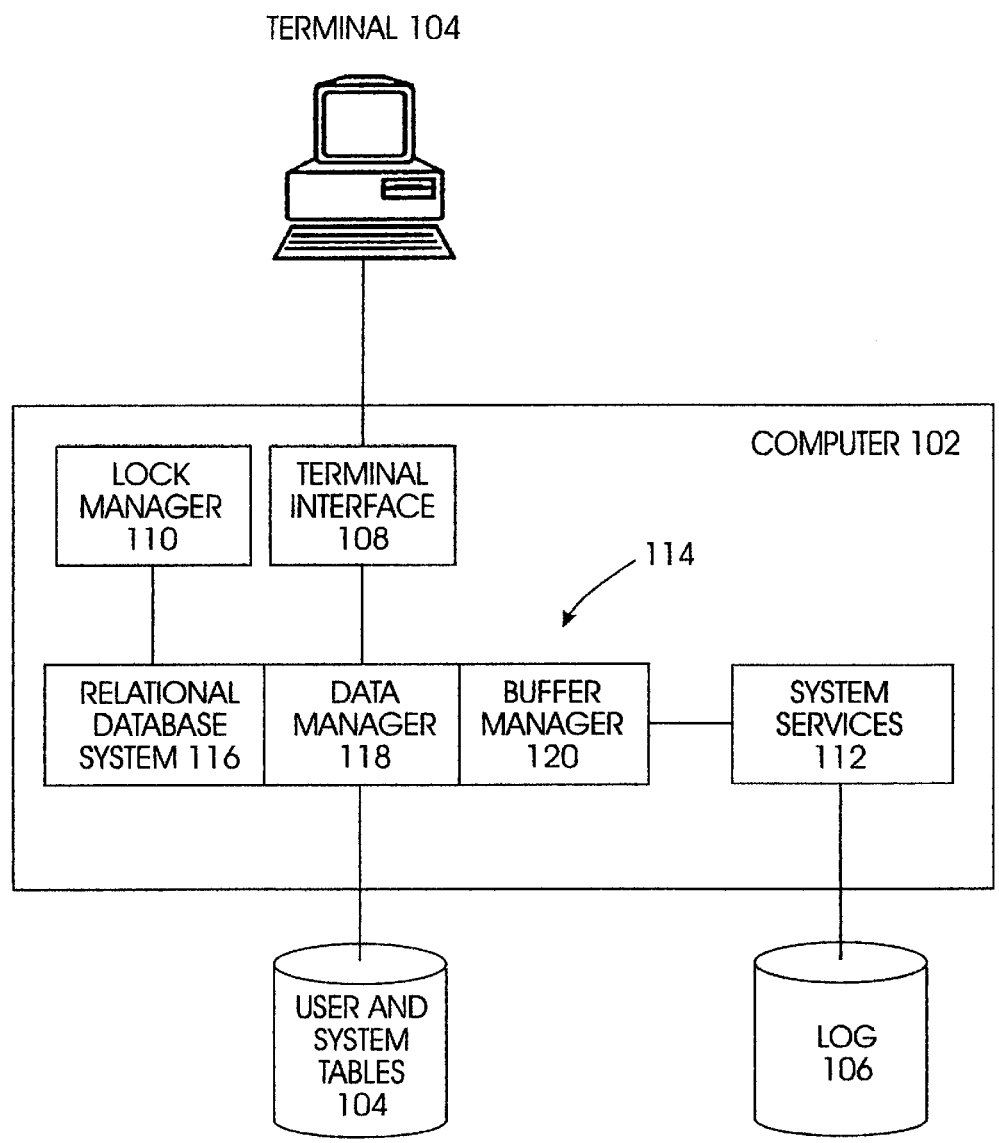
FIG. 1 illustrates the computer hardware environment of the present invention.

FIG. 1 illustrates an exemplary computer hardware environment that could be used with the present invention. In the exemplary environment, a computer system 102 is comprised of one or more processors connected to one or more data storage devices 104 and 106, such as disk drives, that store one or more relational databases.

Operators of the computer system 102 use a standard operator interface 108, such as IMS/DB/DC, CICS, TSO, OS/2 or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational Database Management System (RDBMS) software. In the preferred embodiment of the present invention, the RDBMS software comprises the DB2(r) product offered by IBM for the MVS(tm), OS/2(tm), UNIX(tm), or WINDOWS NT(tm) operating systems. Those skilled in the art will recognize, however, that the present invention has application to any RDBMS software.

As illustrated in FIG. 1, the DB2(r) product includes three major components: the Resource Lock Manager (IRLM)

110, the Systems Services module 112, and the Database Services module 114. The IRLM 110 handles locking services, because DB2 treats data as a shared resource, thereby allowing any number of users to access the same data simultaneously, and thus concurrency control is required to isolate users and to maintain data integrity. The Systems Services module 112 controls the overall DB2 execution environment, including managing log data sets 106, gathering statistics, handling startup and shutdown, and providing management support.

At the heart of the DB2 architecture is the Database Services module 114. The Database Services module 114 contains several submodules, including the Relational Database System (RDS) 116, the Data Manager 118, and the Buffer Manager 120, as well as other elements such as an SQL compiler/interpreter. These submodules support the functions of the SQL language, i.e., definition, access control, retrieval, and update of user and system data.

Generally, each of the components, modules, and submodules of the RDBMS software comprise instructions and/or data, and are embodied in or retrievable from a computer-readable device, medium, or carrier, e.g., a memory, a data storage device, a remote device coupled to the computer 102 by a data communications device, etc. Moreover, these instructions and/or data, when read, executed, and/or interpreted by the computer 102, cause the computer 102 to perform the steps necessary to implement and/or use the present invention.

Thus, the present invention can be implemented as a method, apparatus, or article of manufacture using standard programming and/or engineering techniques to produce software, firmware, hardware, or any combination thereof. The term "article of manufacture", or alternatively, "computer program carrier", as used herein is intended to encompass a computer program accessible from any computer-readable device, carrier, or media. Of course, those skilled in the art will recognize many modifications can be made to this configuration without departing from the scope of the present invention.

Those skilled in the art will recognize that any combination of the above components, or any number of different components, including computer programs, peripherals, and other devices, can be used to implement the present invention, so long as similar functions are performed thereby.

Interactive SQL Execution

Figure 2:
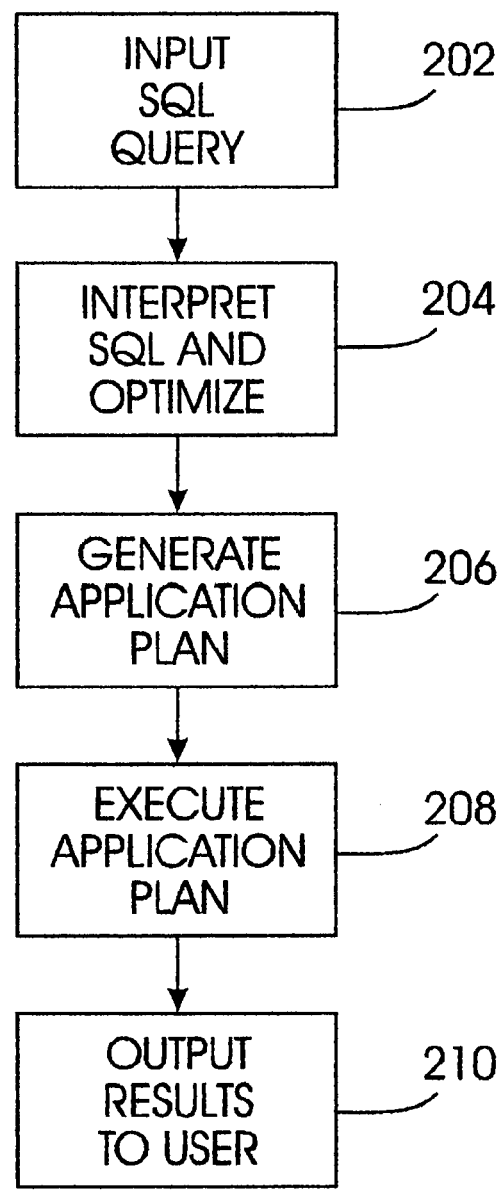
FIG. 2 is a flowchart illustrating the steps necessary for the interpretation and execution of SQL statements in an interactive environment according to the present invention.

FIG. 2 is a flowchart illustrating the steps used for the interpretation and execution of SQL statements in an interactive environment according to the present invention. Block 202 represents the input of SQL statements into the computer system 102. Block 204 represents the step of compiling or interpreting the SQL statements. An optimization function within block 204 can transform or optimize the SQL query in a manner described in more detail later in this specification. Block 206 represents the step of generating a compiled set of runtime structures called an application plan from the compiled SQL statements. Generally, the SQL statements received as input specify only the desired data, but not how to retrieve the data. This step considers both the available access paths (indexes, sequential reads, etc.) and system held statistics on the data to be accessed (the size of the table, the number of distinct values in a particular column, etc.), to choose what it considers to be the most efficient access path for the query. Block 208 represents the execution of the application plan and Block 210 represents the output of the results.

Embedded/Batch SQL Execution

Figure 3:
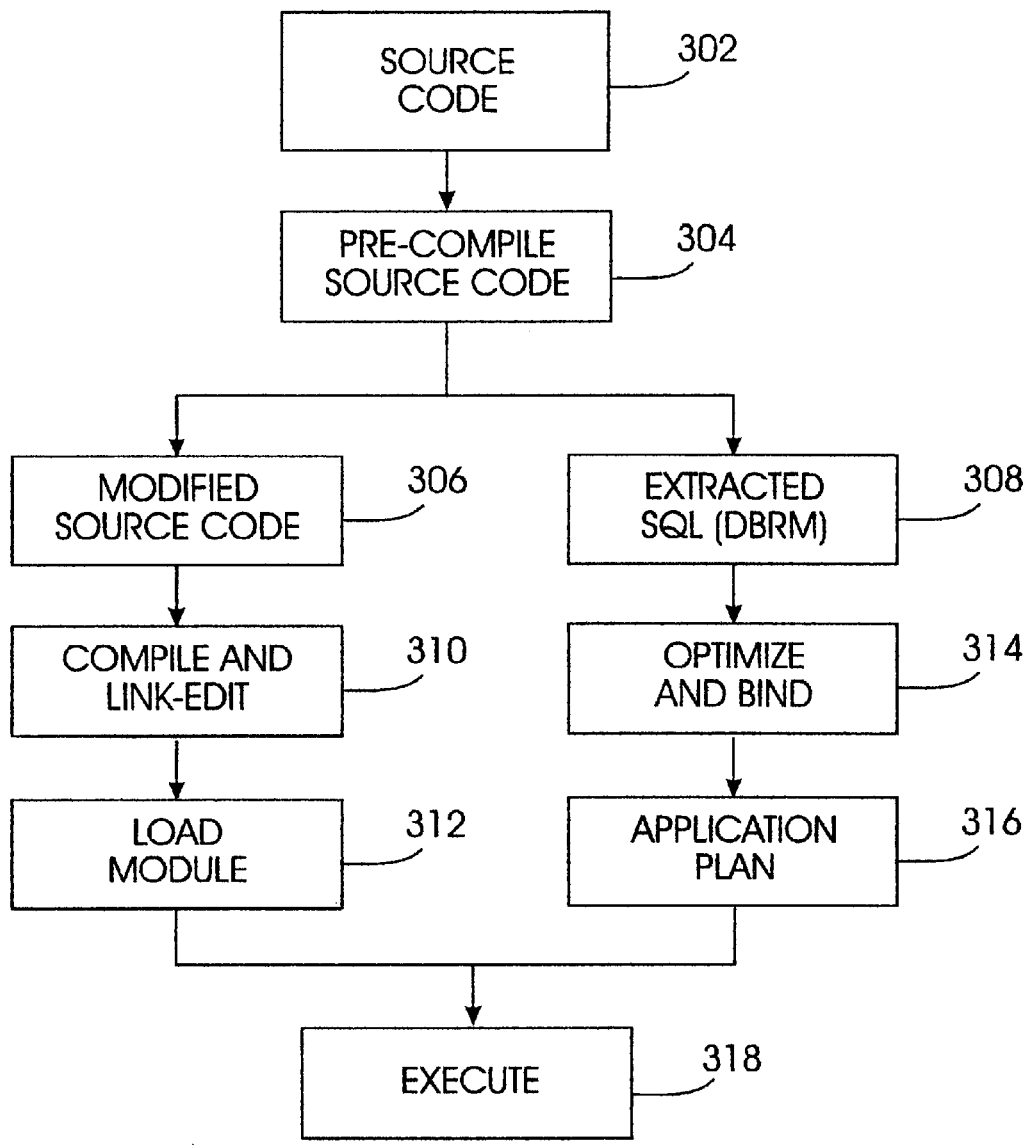
FIG. 3 is a flowchart illustrating the steps necessary for the interpretation and execution of SQL statements embedded in source code according to the present invention.

FIG. 3 is a flowchart illustrating the steps used for the interpretation and execution of SQL statements embedded in source code according to the present invention. Block 302 represents program source code containing a host language (such as COBOL or C) and embedded SQL statements. The program source code is then input to a pre-compile step 304. There are two outputs from the pre-compile step 304: a modified source module 306 and a Database Request Module (DBRM) 308. The modified source module 306 contains host language calls to DB2, which the pre-compile step 304 inserts in place of SQL statements. The DBRM 308 is comprised of the SQL statements from the program source code 302. A compile and link-edit step 310 uses the modified source module 306 to produce a load module 312, while an optimize and bind step 314 uses the DBRM 308 to produce a compiled set of runtime structures for the application plan 316. As indicated above in conjunction with FIG. 2, the SQL statements from the program source code 302 specify only the desired data, but not how to retrieve the data. The optimize and bind step 314 can optimize the SQL query in a manner described in more detail later in this specification. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

OPTIMIZATION TECHNIQUE

For most RDBMS software, combinations of tables and views are used to access data stored in tables in the database. A view definition includes a query that, if processed, provides a temporary results table based on the results of the query at that point in time. Using an INSERT statement and an appropriately defined table in the database, the temporary results table can be stored in the database. To refresh this table, the user would need to perform a DELETE from the table and then perform the INSERT again.

Users can directly query against the created table, provided that the users are aware how the results were derived. Generally, the RDBMS is not aware that such a table is any different from any other table in the database. However, an optimizer within the RDBMS cannot use this table to improve performance, even though the table can contain data that would drastically improve the performance of other queries. This leads to the notion of summary tables or materialized views as envisioned by the present invention. These tables are similar to the created table described above, except that the definition of the table is based on a "full select" (much like a view) that is materialized in the table. The columns of the table are based on the elements of the select list of the full select. A single table can hold aggregated data of multiple grouping combinations, i.e. grouping the same underlying data according to different levels of detail.

As noted above, materialized views must be maintained efficiently to reflect the periodic updates to the database. Given the vast amount of data involved, a critical feature of efficient maintenance methods is that they must be incremental in nature to avoid full re-computation of the queries of the materialized views. One class of materialized views that is known as "self-maintainable materialized views" can be maintained incrementally by processing only the set of updated rows without reference to the underlying tables of the materialized view query. Other materialized views can be maintained incrementally by processing the updated rows and visiting the underlying tables to recompute some portions of the materialized view query.

Consider materialized views that satisfy the following criteria:

1. All criteria mentioned in the patent application of "Incremental Maintenance of Aggregated Join Summary Tables" are valid.
2. The GROUP-BY-clause expression of the SELECT-statement defining the summary table can contain any combination of CUBE( ), ROLLUP( ), and GROUPING SETS( ) constructs which is valid in a regular SELECT statement.
3. The GROUP-BY-clause expression of the summary table must not include duplicate groups, i.e. a single grouping combination must not occur more than once, either implicitly or explicitly.
4. A corresponding GROUPING( ) function in the SELECT clause is required for each nullable column, which is involved in a complex grouping expression using CUBE( ), ROLLUP( ), and GROUPING SETS( ).

The present method incrementally maintains a set of materialized views that is defined by the preceding criteria. Prior work ("Mumick, I. S.; Quass, D.; Mumick, B. S.: Maintenance of Data Cubes and Summary Tables in a Warehouse. In: *Proceedings of the ACM SIGMOD International Conference on Management of Data*, May 13–15, 1997, Tucson, Ariz., USA, (SIGMOD'97) pp. 100–111") has addressed the incremental maintenance of a set of materialized views for the situation where each materialized view is defined only according to a simple grouping expression ("Mumick, I. S.; Quass, D.; Mumick, B. S.: Maintenance of Data Cubes and Summary Tables in a Warehouse. In: *Proceedings of the ACM SIGMOD International Conference on Management of Data*, May 13–15, 1997, Tucson, Ariz., USA, (SIGMOD'97) pp. 100–111, section 5.4). In contrast, the current method supports incremental maintenance of materialized views in the presence of a complex grouping expressions.

OVERVIEW OF GROUPING EXPRESSIONS AND SUMMARY TABLES

The following description introduces the different syntactical expressions for specifying SQL queries containing complex grouping expressions. These kind of queries are used to define summary tables holding data for multiple grouping combinations. This illustration provides the basis to describe the present method of maintaining summary tables with complex grouping expressions.

An Example Scenario

In the example application, the computer system 102 of a credit card company stores credit card customer information, their credit card accounts, and transactions that customers made using credit cards for purchases. A possible database schema, comprising a "star" schema, is illustrated by FIG. 4 and described below:

Table CUST contains customer information.
Table ACCT contains credit card account information. Each customer can have one or more credit cards (i.e., one or more accounts) and a joint account can have one or more customers. Thus, the schema models M:N relationships between table CUST and table ACCT. In order to do this, an auxiliary table ACCTCUST captures the association information between accounts (ACCTS) and customers (CUST).

Table SALESPERSON contains salesperson information.
Table LOC is an un-normalized table that contains the street address, city, state, and country of the stores where transactions are made.
Table TRANS contains transaction information. A customer can make a number of purchases using a particular credit card, and the transaction information is stored in table TRANS. Each transaction was made by a particular salesperson at a particular time and in a particular store. The salesperson, purchase time and location can be aggregated along their respective dimensions.
Table PRODUCT contains information about products, such as cameras, VCRs, etc.
Table PGROUP contains product category information.
Table PRODLINE contains information about product lines.
Table TRANSITEM contains information about the individual items purchased by transactions. This information includes the product id enabling aggregation along the product hierarchy.

Figure 4:
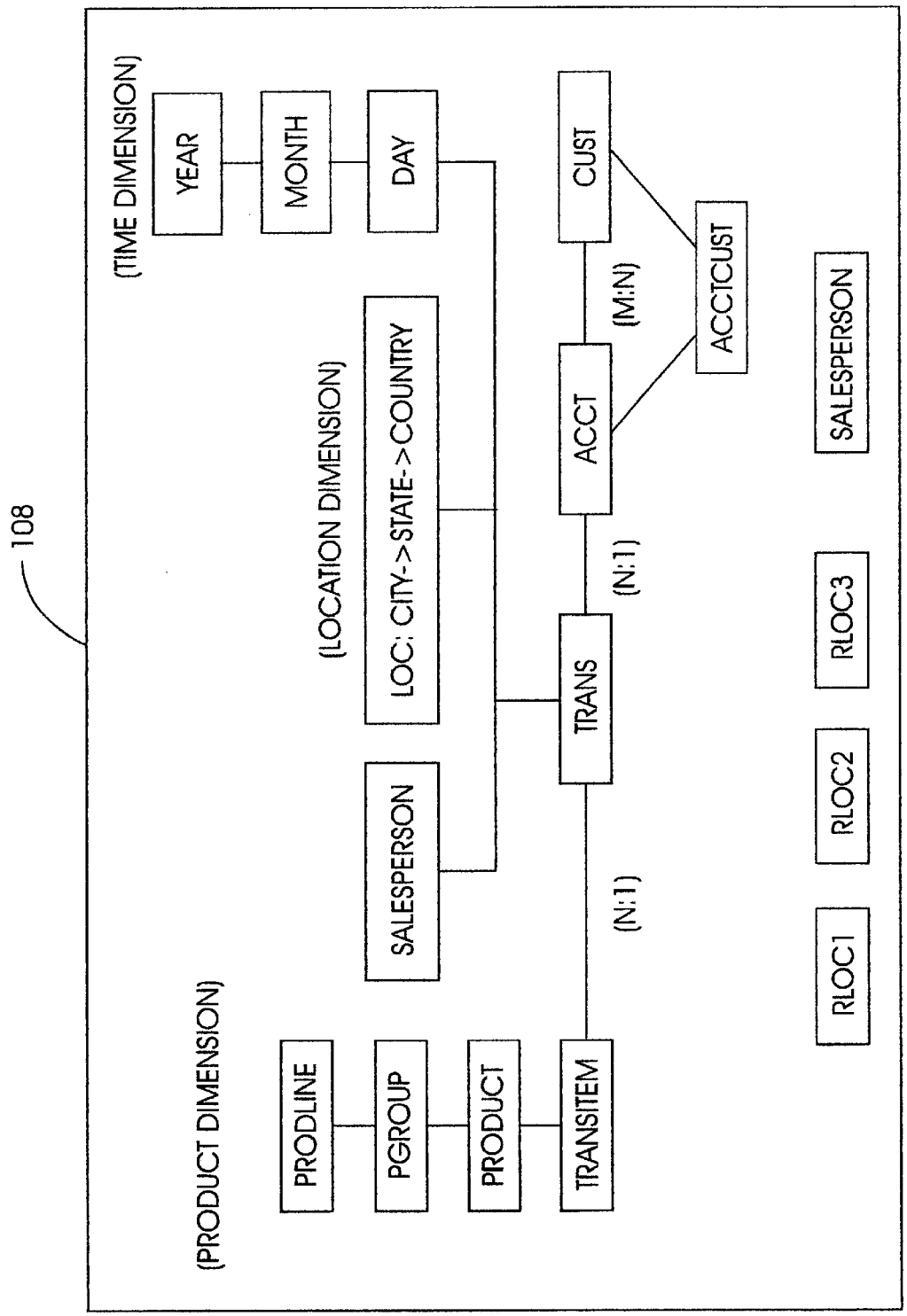
FIG. 4 is a block diagram that illustrates a star schema for a relational database.

Appendix A lists the "CREATE TABLE" statements which can be used to create the tables shown in FIG. 4. In this application, all tables in this database are partitioned via the partitioning keys defined in the corresponding "CREATE TABLE" statement.

Simple Grouping Expressions

In contrast to the classical transactional use of a relational database system, a single query in the context of data warehousing is no longer concerned about individuals but about properties of groups of individuals. In recent SQL-standards and different SQL dialects the definition of groups of individuals characterized by different attributes has been limited to a set of grouping attributes specified in the GROUP-BY-clause of a regular SQL query, i.e. SELECT statement. Within the above application scenario a typical query might look like:

SELECT loc.city, ti.pgid, month(pdate) AS month, SUM
(ti.amount) AS amount
FROM transitem AS ti, trans AS t, loc AS loc
WHERE ti.transid=t.transid
AND t.locid=loc.locid
GROUP BY loc.city, ti.pgid, month(pdate);

This query produces the group (loc.city, ti.pgid, month (pdate)).

Complex Grouping Expressions The CUBE( )-expression produces all possible grouping combinations for a given set of grouping attributes. Therefore modifying the GROUP-BY-clause of the former sample query to SELECT loc.city, ti.pgid, month(pdate) AS month, SUM
(ti.amount) AS amount
FROM transitem AS ti, trans AS t, loc AS loc
WHERE ti.transid=t.transid
AND t.locid=loc.locid
GROUP BY CUBE(loc.city, ti.pgid, month(pdate));

additionally produces the groups (pg.pgid, month(pdate)), (loc.city, month(pdate)), (loc.city, pg.pgid), (loc.city), (pg.pgid), (month(pdate)), and the single group with no grouping attributes ( ) reflecting the grand total.

The 'ROLLUP( )'-extension represents existing functional dependencies and produces grouping combinations according to the order of the specified grouping attributes. For example ROLLUP(loc.country, loc.state, loc.city) results in the grouping combinations (loc.country, loc.state, loc.city), (loc.country, loc.state), (loc.country), and the overall group without any grouping attribute ( ), referred to as the grand total.

It is obvious that each 'CUBE( )'-expression is equivalent of a set of rollup( )-expression with a grouping attribute as the single parameter of a 'ROLLUP( )'-operator. For example, 'GROUP BY CUBE(loc.city, ti.pgid, month (pdate))' is equivalent to 'GROUP BY ROLLUP(loc.city), ROLLUP(ti.pgid), ROLLUP(month(pdate))'.

This representation enables the definition of hierarchical data cubes as a set of ROLLUP( )'s, one for each dimension. The following SQL statement reflects the hierarchical data cube according to the hierarchies of the three dimensions product, location, and time and additionally according to the marital status of the customer. Thus the result of this single query consists of 4*3*3*2=72 different grouping combinations.

SELECT
   loc.country, loc.state, loc.city,
   pg.lineid, pg.pgid,
   year(t.pdate) AS year, month(t.pdate) AS month,
   c.marital_status,
   SUM(ti.amount) AS amount
FROM
   transitem AS ti, trans AS t, loc AS loc,
   pgroup AS pg, acct AS a, cust AS c
WHERE ti.transid=t.transid
   AND ti.pgid=pg.pgid
   AND t.locid=loc.locid
   AND t.acctid=a.acctid
   AND a.custid=c.custid
GROUP BY
   ROLLUP(loc.country, loc.state, loc.city),
   ROLLUP(pg.lineid, pg.pgid),
   ROLLUP(year(t.pdate), month(t.pdate)),
   ROLLUP(c.marital_status);

Generalization of Complex Grouping Expressions: Grouping Sets

The most general form for specifying complex grouping expressions is the 'GROUPING SETS( )'- extension, consisting of a list of grouping combinations which should occur in the output. The result of the following example is equivalent to the result of the union of two simple grouping expressions, one for (loc.country, pg.lineid) and one for (loc.country, pg.pgid, year(t.pdate)):

. . . GROUP BY GROUPING SETS ((loc.country, pg.lineid), (loc.country, pg.pgid, year(t.pdate))), . . .

Moreover, it is obvious that the 'CUBE( )' as well as the 'ROLLUP( )' operator can be seen as abbreviations for an explicit list of grouping combinations. In general the following rules apply for the mapping of 'CUBE( )' and 'ROLLUP( )' expressions to a 'GROUPING SETS( )' expression:

With $A_i$ ($1<=i<=n$) as grouping attributes, the expression
   CUBE($A_1$, . . . , $A_n$) corresponds to the expression
   GROUPING SETS($X_1$, . . . , $X_m$), with $m=2^n$ and $X_i$ ($1<=i<=m$) as the elements of the power set for $\{A_1, \ldots, A_n\}$. Thus CUBE( ) generates all possible $2^n$ grouping combinations, i.e.: ($A_1, \ldots, A_n$), ($A_2, \ldots, A_n$), . . . , ($A_1, \ldots, A_{n-1}$), . . . , ($A_1$), . . . , ($A_n$), ( ))
With $A_i$ ($1<=i<=n$) as grouping attributes, the expression
   ROLLUP($A_1$, . . . , $A_n$) corresponds to the expression
   GROUPING SETS(($A_1$, . . . , $A_n$), ($A_1$, . . . , $A_{n-1}$), ($A_1$, . . . , $A_{n-2}$), . . . , ($A_1$), ( )), resulting in n+1 different grouping combinations.

Since the 'CUBE( )' as well as the 'ROLLUP( )' operator can be equivalently expressed as grouping sets, we always refer to set of grouping combinations when discussing complex grouping expression. A complex grouping expression is formally denoted by gs($grp_1$, . . . , $grp_n$), where each $grp_i$ ($1<=i<=n$) corresponds to a single grouping combination. According to the example above, $grp_1$=(loc.country, pg.lineid) and $grp_2$=(loc.country, pg.pgid, year(t.pdate)).

Nullable Columns in Complex Grouping Expressions

In the context of the definition of an incrementally maintainable summary table, the SELECT-clause of the defining SQL query with a complex grouping expression has to encompass all grouping attributes specified in the GROUP-BY-clause. If all grouping attributes are non-nullable, then they reflect a primary key of the resulting table. These columns plus the columns of the applied aggregate functions define the schema of the query result, i.e. the table schema in the context of a summary table.

For a specific row at the instance level, the value of an attribute that is currently not involved in a grouping expression results in a system-generated NULL-value. For example the total amount value which is obtained by considering no grouping attributes in the current grouping expression is represented by a row with NULL-values as instances in the primary key attributes.

In the case of nullable grouping columns, this can cause conflicts with naturally occurring NULL values. To indicate system-generated NULL-values for a specific attribute, the built-in aggregate function 'GROUPING( )' can be applied to a grouping attribute and added to the set of primary keys of the resulting table. The 'GROUPING( )'-function returns '1' if the corresponding value of the attribute was generated by the system; otherwise it returns '0'. To illustrate the behaviour of 'GROUPING( )'-functions, we refer to the following example, where a data cube is computed over two grouping attributes and the select clause additionally shows the results of the grouping functions. Initially, the underlying table is populated with a single row having NULL-values for both grouping attributes.

INSERT INTO nulldemo (a,b,c) VALUES (NULL, NULL, 4711);
SELECT a,b,grouping(a) as grp_a, grouping(b) as grp_b, sum(c) sum_c
FROM nulldemo
GROUP BY CUBE(a,b);

This query results in 4 rows where the grouping function columns are used to determine whether the value of the corresponding attribute reflects a user-defined value or whether the value is the result of the grouping procedure.

| A | B | GRP_A | GRP_B | SUM_C | |
|---|---|---|---|---|---|
| — | — | 0 | 0 | 4711 | // group (a, b) |
| — | — | 0 | 1 | 4711 | // group (a) |
| — | — | 1 | 0 | 4711 | // group (b) |
| — | — | 1 | 1 | 4711 | // grand total |

A last point which is worth mentioning in this context and which becomes important in the context of the delete operation in the incremental maintenance procedure is the behaviour of grouping expressions over an empty table. The general rule for computing the grand total (no grouping attributes) on an empty table is to a single row with system-generated NULL values as the instances of the grouping attributes. Therefore the above query over an empty table shows the following result (Note: the aggregate function SUM results in a NULL value when ranging over an empty input set):

| A | B | GRP_A | GRP_B | SUM_C | |
|---|---|---|---|---|---|
| — | — | 1 | 1 | — | // grand total |

Summary Tables with Complex Grouping Expressions

The definition of an immediate refreshable summary table with complex grouping expressions refers to a SQL query with the following characteristics:

All characteristics for incremental maintainable summary tables with a simple group-by expression apply, e.g. the query is an aggregate query and the aggregate functions of the SELECT list must be self-maintainable.

The GROUP-BY-clause can consist of any combination of the 'CUBE( )', 'ROLLUP( )', and 'GROUPING SETS( )' constructs which is valid in regular SELECT statements.

The grouping combination must not exhibit duplicate groups, i.e. a single grouping combination must not occur more than once either implicitly or explicitly For example, the complex grouping expression 'ROLLUP(a, b),a' is not allowed, because this expression produces the combinations ((a,b),a)=(a,b), ((a),a)=(a), and (( ),a)=(a). Thus the (a) combination appears twice.

A corresponding 'GROUPING( )' function in the SELECT clause is required for each nullable column which is involved in a complex grouping expression using 'ROLLUP( )' and 'CUBE( )'.

The following statement defines a sample summary table holding a hierarchical data cube expressed with a complex grouping expression:

CREATE SUMMARY TABLE ast_hcube AS (
SELECT
   loc.country, loc.state, loc.city,
   pg.lineid, pg.pgid, c.marital_status, c.income_range,
   year(t.pdate) as year, month(t.pdate) as month,
   SUM(ti.amount) AS amount, COUNT(*) AS count,
   GROUPING(loc.country) grp_country,
   GROUPING(loc.state) grp_state,
   GROUPING(loc.city) grp_city,
   GROUPING(pg.lineid) grp_lineid,
   GROUPING(pg.pgid) grp_pgid,
   GROUPING(year(t.pdate)) grp_year,
   GROUPING(month(t.pdate)) grp_month,
   GROUPING(c.marital_status) grp_mstat,
   GROUPING(c.income_range) grp_irange
FROM
   transitem AS ti, trans AS t, loc AS loc,
   pgroup AS pg, acct AS a, cust AS c
WHERE ti.transid=t.transid
   AND ti.pgid=pg.pgid
   AND t.locid=loc.locid
   AND t.acctid=a.acctid
   AND a.custid=c.custid
GROUP BY
   ROLLUP(loc.country, loc.state, loc.city),
   ROLLUP(pg.lineid, pg.pgid),
   ROLLUP(year(t.pdate), month(t.pdate)),
   CUBE(c.marital_status, c.income_range)
) DATA INITIALLY DEFERRED REFRESH IMMEDIATE;

The complex grouping expression consists of a 3+2 dimensional hierarchical data cube, specified as a combination of 'ROLLUP( )'s for the location, product and time dimension and a 'CUBE( )' for that splits the customer dimension according to marital status and income range.

Incremental Maintenance of Summary Tables with Complex Grouping Expressions

The present method is an improvement of the incremental maintenance method described in U.S. Provisional Patent Application S/No. 60/135,277 ("Incremental Maintenance of Aggregated Join Summary Tables"). It extends this method to incrementally maintain summary tables specified with complex grouping expressions. In contrast to summary tables with simple grouping expressions, the change (insert/delete/update) of a single row of the base data can affect multiple rows in the summary table. The present method extends the existing framework comprising two independent phases (propagate and apply), which are summarized below.

Figure 6:
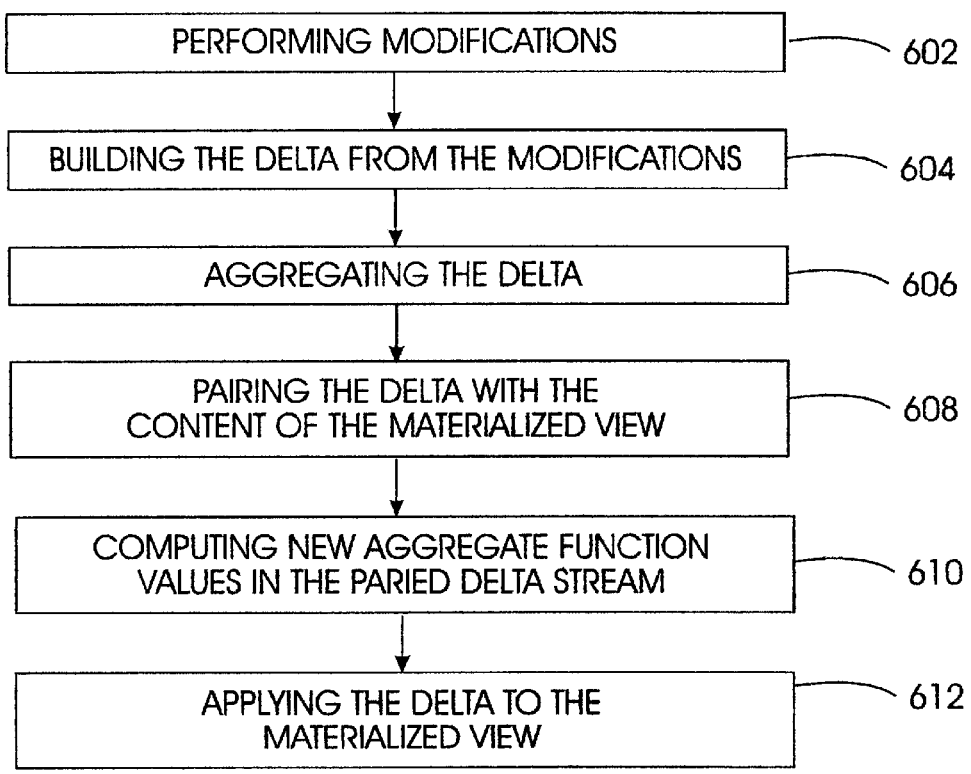
FIG. 6 is a flowchart of a maintenance method according to an embodiment of the present invention.

FIG. 6 is a flowchart of a maintenance method according to an embodiment of the present invention. This figure illustrates the above steps.

Propagation Phase

The first step of incrementally maintaining summary tables comprises computing the raw delta (604) as the result of an insert/delete/update operation (602) on the base tables (STEP I). For update operations on the base tables, the delta stream is extended by a 'tag-column'. This tag-column is used to treat an update operation as a combination of a delete operation (of the old values) and an insert operation (of the new values).

In the second step, the raw delta stream is aggregated (606) according to the grouping definition of the summary table, which is the subject of the current maintenance procedure. This patent application extends the prior work in a way that it supports complex grouping expression in this second step (STEP II).

Apply Phase

After aggregation, the delta stream is applied to the current state of the summary table. First, the affected rows in the summary table are identified and paired with their corresponding delta using a left outer-join between the delta and the summary table over the columns of the group-by clause and existing grouping function columns (STEP III) (608). Subsequently, the new values for the aggregate columns are determined (STEP IV) (610). Finally, a sequence of update, delete, and insert statements apply the delta changes to the summary table (STEP V) (612). Details of these data manipulation commands in the presence of complex grouping expressions will be desrcribed later.

To summarize, the proposed approach for incrementally maintaining summary tables with complex grouping expression works correctly by Applying the complex grouping expression to the raw delta yielding a delta stream consisting of multiple (but distinct) grouping combinations and Inserting/deleting/updating delta values into/from the existing summary table, so that each grouping combination of the delta stream modifies its corresponding grouping combination in the summary table.

The present method willll now be described in more detail by reference to FIGS. 7–9.

STEP I: Building the Raw Delta

The first step of the propagation phase is the generating the delta stream from the original modification (702, 802, 902). This delta stream is subject to the next step of aggregation. The overall raw delta stream is the output delta (706, 806, 906) derived for the selection, projection, union all and inner join operators of the query defining the input to the aggregation of the query defining the summary table. If the original modification is an update, this output delta will contain a tag column. Otherwise (it is an insertion or deletion) it does not contain a tag column. One embodiment for computing the output delta for selection, projection, union all and inner join operators is given in U.S. Provisional Patent Application S/No. 60/135,277, filed on May 21, 1999. Multiple local delta streams are caused either directly by the insert/delete/update command of the user or indirectly through the enforcement of database semantics such as referential integrity constraints (e.g.. 'ON DELETE CASCADE'), and triggers. Furthermore, all UPDATE operations add both before and after image rows to the delta and extend it with a numeric 'tag column' (904). The tag column holds the numeric value '1' for rows representing after images, '−1' for rows representing before images.

STEP II: Aggregating the Delta

The following description details the second step of the incremental maintenance technique for summary tables with complex grouping expressions. This step aggregates the generated raw delta from Step I to appropriately reflect the changes, which have to be made to the summary table.

To avoid the discussion of the single cases for 'CUBE( )', 'ROLLUP( )', and 'GROUPING SETS( )', we assume for the remainder of this description a general grouping expression (grouping set) ranging over n distinct grouping combinations. Since the proposed technique also works for the special case of n=1 it can be considered a seamless extension of the existing framework covering only simple grouping expressions.

For the further description and explanation consider the definition of a summary table t based on a base table R.

CREATE TABLE R ( $A_1$ INTEGER,
   $A_2$ INTEGER NOT NULL,
   $A_3$ INTEGER NOT NULL,
   $B_1$ INTEGER,
   $B_2$ INTEGER NOT NULL);
CREATE TABLE t AS (
   SELECT $A_1$, $A_2$, $A_3$,
   GROUPING($A_1$) AS $G_1$,
   GROUPING($A_2$) AS $G_2$,
   SUM($B_1$) AS $S_1$,
   COUNT($B_1$) AS $C_1$,
   SUM($B_2$) AS $S_2$,
   COUNT(*) AS C
   FROM R
   GROUP BY CUBE($A_1$, $A_2$, $A_3$)
DATA INITIALLY DEFERRED REFRESH IMMEDIATE;

The base table includes five attributes; attributes $A_1$, $A_2$, and $A_3$ are the grouping attributes in the complex grouping expression CUBE($A_1$, $A_2$, $A_3$) in summary table t. $A_1$ is nullable, whereas $A_2$ and $A_3$ are declared non-nullable, i.e. user-defined NULL values are not allowed. The attributes $B_1$ and $B_2$ are used as parameters for the SUM aggregate function in the summary table. Since $B_1$ is nullable a corresponding COUNT aggregate function is required in the summary table. Moreover the summary table t holds two 'GROUPING( )'-function columns for the attributes $A_1$ (which is required because $A_1$ is nullable) and $A_2$ (which is optional because $A_2$ is non-nullable).

In general, the delta stream is aggregated according to the grouping specification of the summary table (708, 808, 908). It is of paramount importance for that patent application that this step results in a data stream holding multiple grouping combinations in the presence of a complex grouping expression of the summary table. For example, if the summary table is defined using 'CUBE( )', then this aggregation step yields in a complete delta cube with 'higher' aggregate values for the original delta changes.

In the case of an underlying update operation, the aggregation specification for step 908 is extended to include the tag column as grouping column. After this first aggregation, the resulting aggregate values are multiplied with the value of the tag column (910). This action results in negative aggregation figures for the old values. To finally compute the net changes (and eliminate the tag column), a further aggregation step is necessary (912). In contrast to the first aggregation operation, this second aggregation is performed as a simple aggregation over all grouping columns plus all grouping function columns. This plain aggregation step is independent of the shape of the original group-by specification. Moreover, each aggregation function has to be replaced by its corresponding refresh function, e.g. COUNT( ) in the lower aggregation is converted to SUM( ).

To summarize, the second step of 'Delta Aggregation' produces a delta cube according to the complex group-by expression of the summary table definition, which has to be applied to the current content of the summary table. In the case of an underlying update operation, a 'negative' delta cube is merged with a 'positive' delta cube to obtain the net changes, again for all specified grouping combinations.

To sketch the correctness of this proposed approach using an example, we argue that the result of a complex grouping expression can be considered the union of the result of simple grouping expressions, i.e. the body of the above sample summary table definition can be re-written as:

SELECT $A_1$, $A_2$, $A_3$,
   GROUPING($A_1$) AS $G_1$,
   GROUPING($A_2$) AS $G_2$,
   SUM($B_1$) AS $S_1$,
   COUNT($B_1$) AS $C_1$,
   SUM($B_2$) AS $S_2$,
   COUNT(*) AS C
FROM R
GROUP BY $A_1$, $A_2$, $A_3$
UNION
SELECT NULL AS $A_1$, $A_2$, $A_3$,
   1 AS $G_1$,
   GROUPING($A_2$) AS $G_2$,
   SUM($B_1$) AS $S_1$,
   COUNT($B_1$) AS $C_1$,
   SUM($B_2$) AS $S_2$,
   COUNT(*) AS C
FROM R
GROUP BY $A_2$, $A_3$
UNION
. . . // missing combinations are : (A1, A3), (A2, A3), (A1), (A2)

UNION
SELECT NULL AS $A_1$, NULL AS $A_2$, $A_3$,
   1 AS $G_1$,
   1 AS $G_2$,
   SUM($B_1$) AS $S_1$,
   COUNT($B_1$) AS $C_1$,
   SUM($B_2$) AS $S_2$,
   COUNT(*) AS C
FROM R
GROUP BY $A_3$
UNION
SELECT NULL AS $A_1$, NULL AS $A_2$, NULL AS $A_3$,
   1 AS $G_1$,
   1 AS $G_2$,
   SUM($B_1$) AS $S_1$,
   COUNT($B_1$) AS $C_1$,
   SUM($B_2$) AS $S_2$,
   COUNT(*) AS C
FROM R

Since all grouping combinations are different and the set of all attributes involved in the complex grouping expression plus the existing grouping function columns define the primary key of the result, we can observe that each delta stream grouped by a specific grouping combination only affects the part of the summary table with the same grouping combination. In other words, since modifications are local to grouping combinations, the delta stream itself can consist of rows belonging to different grouping combinations. The only restriction with regard to the structure of a complex grouping expression is that the expanded grouping specification exhibits only distinct grouping combinations, which is required in the summary table definition.

STEP III: Pairing the Delta to the Summary Table

After aggregation, the delta is paired with the current content of the summary table using a left outer-join over the grouping and grouping function columns (714, 814, 914). Thus, a group of the summary table matches either with a corresponding delta group or delta groups do not find a corresponding group in the AST. Those delta groups are later added to the summary table.

In contrast to the result of a simple grouping expression, the result of complex grouping expression can consist of NULL values which indicate higher aggregated values, i.e. (sub)-totals according to a specific column. To distinguish between naturally occurring NULL-values and NULL-values indicating higher aggregated values, grouping function columns are required for the definition of the summary table and must be adequately considered for the generation of the left outer-join predicate to apply the already grouped delta stream to the existing summary table. The result of that operation is then used to apply the appropriate changes to the summary table (see subsequent sections).

The table of FIG. 5 lists all different combinations for the generation of the outer-join predicate for each single grouping attribute $A_i$ involved in the grouping expressions of a summary table. The delta stream after the application of the complex grouping operation is denoted by $\delta$, the summary table data stream is denoted by $\tau$. Moreover $G_i$ denotes the corresponding grouping function column for the attribute $A_i$.

In the situation where the grouping attribute is not involved in a complex grouping expression, the attribute values of the delta and summary table streams have simply to be equal. Since the test on equality evaluates to false if both attribute values are NULL, the predicate must be extended by the test on 'IS NULL' for both grouping attributes if they are nullable. The same predicate applies in the cases where (a) the current attribute is involved in a complex grouping expression (thus producing subtotals) and the attribute is non-nullable with no corresponding grouping function column or (b) the attribute is nullable and the required grouping function column is specified. To distinguish between user-defined and system-generated NULL values, the later one, b, requires an extension of the predicate by a test on equality of the corresponding grouping function columns.

In the case where an optional grouping function column is available, i.e. the grouping attribute is non-nullable, the join predicate is optimized by substituting for the test of NULL-values of both attributes with a test of whether the current NULL-value represents a higher aggregate value ($\tau.G_i=1$).

To generate the join predicate for the ongoing example, we note that all attributes are involved in a complex grouping expression. The attribute $A_1$ is considered nullable whereas no user-defined NULL values are allowed for the attribute $A_2$ and $A_3$. The columns $G_1$ and $G_2$ reflect corresponding grouping functions. Since the column $A_1$ is nullable, $G_1$ is required; $G_2$ is optional.

SELECT $\delta.A_1$, $\delta.A_2$, $\delta.A_3$, $\delta.G_1$, $\delta.G_2$,
   $S_1$_NEW, $C_1$_NEW, $S_2$_NEW, C—NEW
   $\tau$.C AS C_OLD,
FROM $\delta$ left outer join $\tau$
WHERE ($\delta. A_1=\tau.A_1$) OR ($\delta. A_1$ IS NULL AND $\tau.A_1$ IS NULL)
AND ($\delta.G_1=\tau.G_1$)
AND ($\delta.G_2=1$) OR ($\delta.A_2=\tau.A_2$)
AND ($\delta.G_2=\tau.G_2$)
AND ($\delta.A_3=\tau.A_3$) OR ($\delta.A_3$ IS NULL AND $\tau.A_3$ IS NULL)

Figure 7:
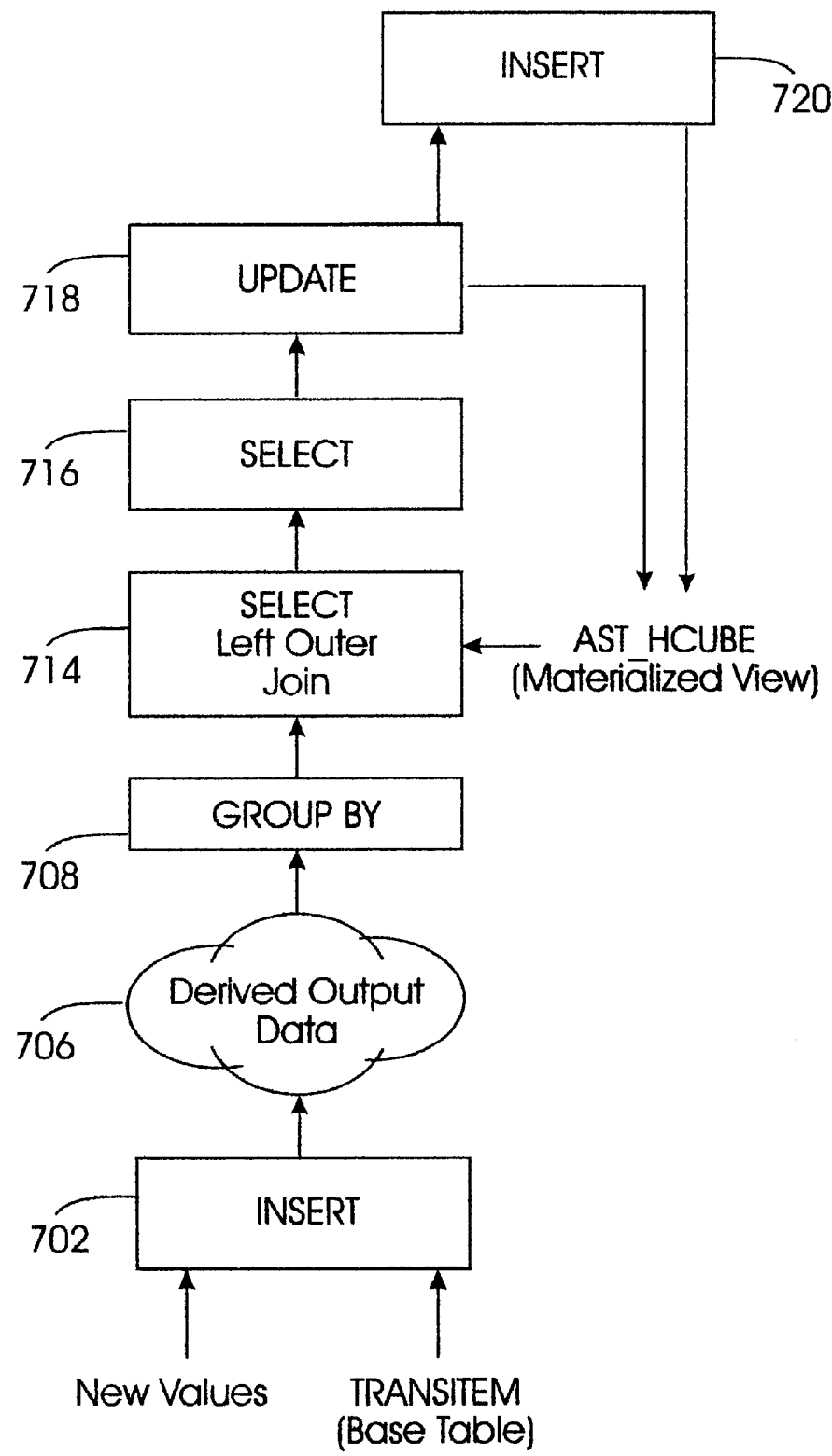
FIG. 7 is a dataflow diagram showing results of application of the method of FIG. 6 when the original modification is an INSERT operation.
Figure 8:
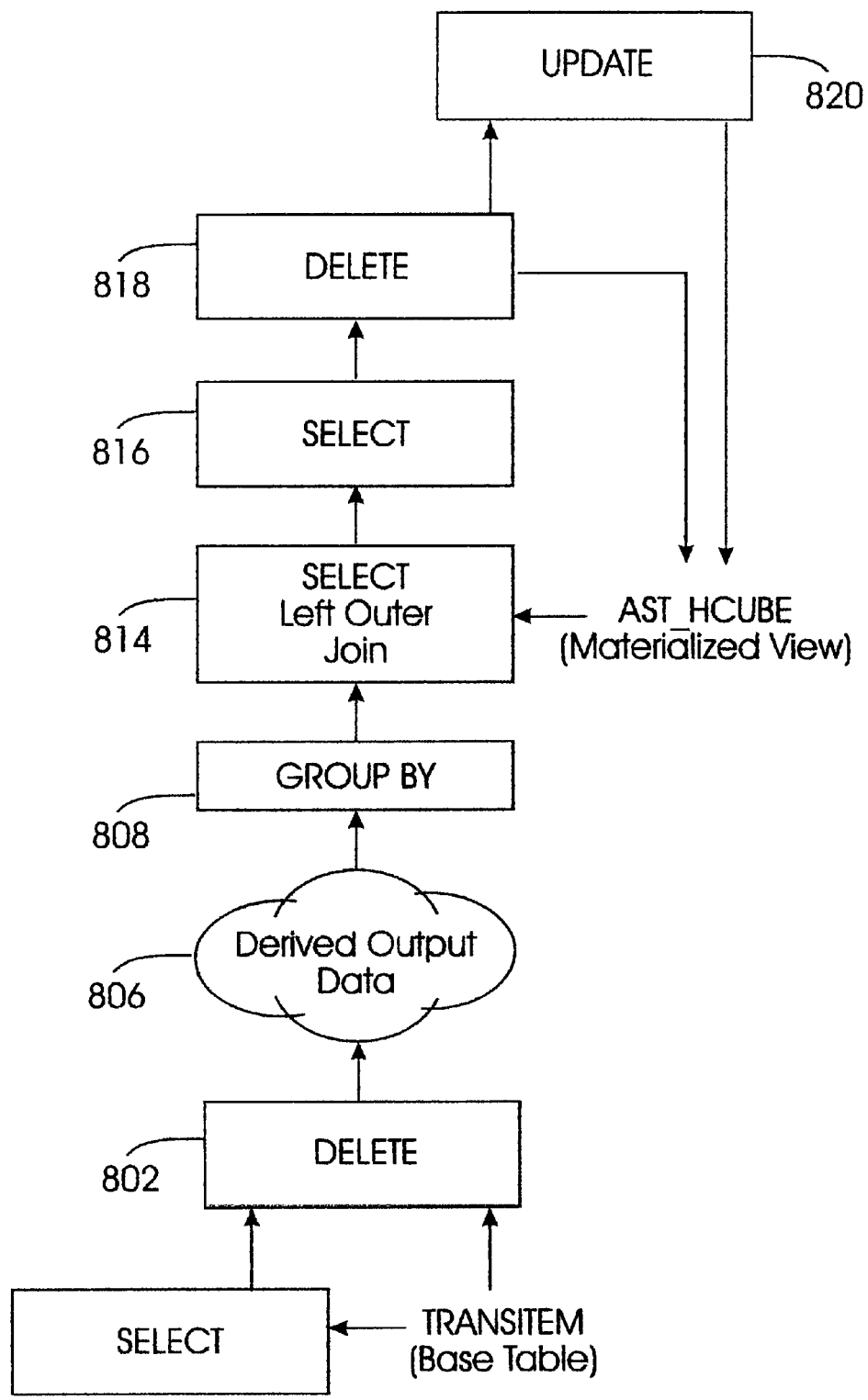
FIG. 8 is a dataflow diagram showing results of application of the method of FIG. 6 when the original modification is an DELETE operation; and, FIG. 9 is a dataflow diagram showing results of application of the method of FIG. 6 when the original modification is an UPDATE operation.
Figure 9:
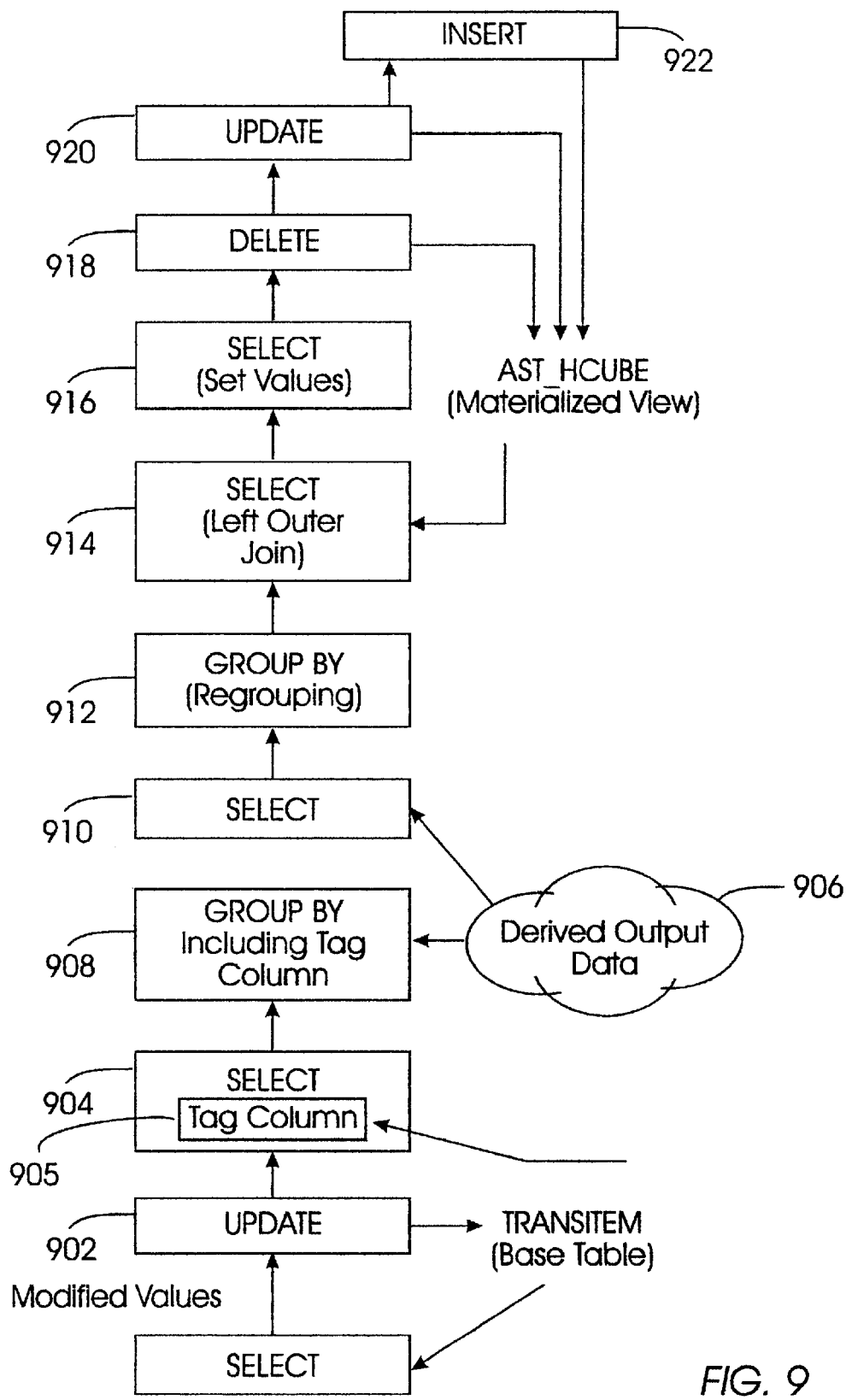

The above type of expression or query represents the computation performed in step 714, 814, 914 of FIGS. 7–9.

Note that we do not give a production rule for the new aggregation function values (S1_NEW, C1_NEW, S2_NEW, C_NEW) here. Necessary adjustments are described in the following subsection 5.5. Moreover, it is worth mentioning that we keep the COUNT(*) column of the summary table in the C_OLD column. This column is needed to correctly determine certain apply configurations.

STEP IV: Aggregate Value Adjustments

After pairing rows in the aggregated delta stream with their corresponding rows in the summary table data stream using the outer-join described in the preceding section, new values for the maintenance must be effected in the summary table content using insert/update/delete statements (918, 920, 922) (718, 720) (818,820). Which statement type is used per row depends on the operation performed on the underlying base table(s). Before applying the changes, further adjustments are necessary to handle cases when the input groups are empty. In this case, all aggregate functions (with the exception of COUNT( )) return NULL, which requires extra logic for incremental maintenance to adjust the compensated value to NULL (716, 816, 916). This logic is further complicated when the argument of an aggregate function is nullable since all null values are eliminated before the aggregate function is applied. (Note that count(*) is not applicable here since it does not take an attribute as its argument). Consider SUM(A) and let S be the column name for SUM(A) in $\delta$ and $\tau$. There are two cases when $\delta.S+\tau.S$ evaluates to 0: (1) when the input groups are non-empty and the sum of the delta changes negate the previous sum and (2) when the last non-null value of A is deleted. In the first case, the compensated value should remain 0, and in the later case, the compensated value should be NULL. Note also that $\delta.S$ and $\tau.S$ can themselves be NULL which would generate undesired values for $\delta.S+\tau.S$. To distinguish between cases (1) and (2), the summary table must include a column with the value for count(A). (Note, if A is non-nullable, count(*) is sufficient.). These issues were mentioned very briefly in: Mumick, I. S.; Quass, D.; Mumick, B. S.: Maintenance of Data Cubes and Summary Tables in a Warehouse. In: *Proceedings of the ACM SIGMOD International Conference on Management of Data*, May 13–15, 1997, Tucson, Ariz. USA, (SIGMOD'97) pp. 100–111, 3.1. However, complex grouping sets that contain grand-total add a new dimension to this problem.

When the grouping set of a summary table contains a grand total row and the resulting group is empty, then the result of the grouping query contains a single row with the value null for all aggregate functions except count which contains the value 0. The following logic computes the correct results for SUM(A) for simple and complex grouping sets:

$\tau.S=SUM(\tau.A)$; $\delta.S=SUM(\delta.A)$;
$\tau.C=COUNT(A)$; $\delta.C=COUNT(\delta.A)$;
$\tau.C'=COUNT(*)$ for table $\tau$; $\delta.C'=COUNT(*)$ for delta $\delta$;
If (A is nullable) then
  CASE
  WHEN ($\delta.C+\tau.C=0$) THEN NULL
  WHEN ($\tau.S$ is null) THEN $\delta.S$
  WHEN ($\delta.S$ is null) THEN $\tau.S$
  ELSE $\delta.S+\tau.S$
  END
else
  CASE
  WHEN (($\delta.C'+\tau.C'=0$) AND P(GRAND_TOTAL_ROW)) THEN NULL
  WHEN ($\tau.S$ is null) THEN $\delta.S$
  WHEN ($\delta.S$ is null) THEN $\tau.S$
  ELSE $\delta.S+\tau.S$
  END
end The above logic is performed by step 716, 816 and 916 of FIGS. 7–9.

The predicate P(GRAND_TOTAL_ROW_) identifies the grand total row and consists of a conjunction of the following test for each grouping attribute $A_i$ ($1<=i<=n$) of the summary table definition: If for a grouping column $A_i$ exists a corresponding grouping function column $G_i$ then this one is tested on equality with 1 (thus representing a higher value aggregate). Otherwise the grouping column is checked for having NULL as its value, i.e. ISNULL($A_i$). Notice that one predicate per grouping attribute/grouping function attribute pair is sufficient to identify the grand total row. Note also that the value of SUM(A) can be computed unnecessarily here for groups that are destined to be deleted since the decision to delete a row is made by a subsequent phase.

To adjust the COUNT( ) aggregation function, the two corresponding COUNT( ) columns from the delta and from the summary table are added. Since the result of a COUNT( ) function is never a NULL value, further adjustment like for the SUM( ) aggregation function are not necessary.

For the ongoing example the aggregate function columns are converted to the following expressions:

S1_NEW based on SUM(B1) as $S_1$ (from table $\tau$ and delta $\delta$) with COUNT(B1) as C (from table $\tau$ and delta $\delta$):
  CASE
  WHEN ($\delta.C+\tau.C=0$) THEN NULL
  WHEN ($\tau.S_1$ is null) THEN $\delta.S_1$
  WHEN ($\delta.S_1$ is null) THEN $\tau.S_1$
  ELSE $\delta.S_1+\tau.S_1$
  END
AS S1_NEW
C1_NEW based on COUNT(B1) as C (from table $\tau$ and delta $\delta$):
  $\delta.C+\tau.C$ AS C1_NEW
S2_NEW based on SUM(B2) as S2 (from table $\tau$ and delta $\delta$) with COUNT(*) as C' (from table $\tau$ and delta $\delta$):
  CASE
  WHEN ($\delta.C'+\tau.C'=0$)
    AND P(GRAND_TOTAL_ROW) THEN NULL
  WHEN ($\tau.S_2$ is null) THEN $\delta.S_2$
  WHEN ($\delta.S_2$ is null) THEN $\tau.S_2$
  ELSE $\delta.S_2+\tau.S_2$
  END
AS S2_NEW
for COUNT(*) as C' (from table $\tau$ and delta $\delta$):
  $\delta.C'+\tau.C'$ AS C_NEW The predicate to identify the grand total row for the ongoing example looks like:

$$P(GRAND\_TOTAL\_ROW) := (G_1=1) \text{ AND } (G_2=1) \text{ AND } (ISNULL(A_3))$$

STEP V: Applying the Delta to the Summary Table
Apply Configuration for a Base Table INSERT Operation For an insert operation on a base table, the delta stream after the outer-join is divided into an update and an insert stream of rows to be updated in or inserted into the summary table. If, for a single row of the delta stream, there is an existing group in the summary table (indicated by a matching join partner during the outer join), then the aggregate function values of this group are overwritten by the new compensated values of the delta stream. Otherwise, when a group of the delta stream does not match with an existing group of the summary table (this is denoted by NULL values in the original count column C_OLD due to the outer-join) this new group with the new values for the aggregate function is inserted into the summary table.

If (isnull($\tau.C\_OLD$)) then
  INSERT INTO $\tau$
  VALUES($\tau.C=\delta.C\_NEW, \tau.S=\delta.S\_NEW$)
else
  UPDATE $\tau$
  SET $\tau.C=\delta.C\_NEW$,
  $\tau.S=\delta.S\_NEW$
  WHERE $\delta.C\_NEW>0$
end The above logic is performed by steps 718 and 720 of FIG. 7.
Apply Configuration for a Base Table DELETE Operation Analagous to the insert operation, a delete operation on the underlying base table can cause rows to be both updated in and deleted from the summary table. Hence, the delta stream after the outer-join is divided into an update and a delete stream. Again, a group in the original summary table is updated if the count value of the delta stream is greater than zero, i.e. there remains at least one member in the group. If the cardinality of the new group becomes zero, than a delete operation eliminates that group in the resulting summary table, with the exception of the grand-total. As previously mentioned, complex grouping expressions generating the grand-total row result in at least one row, even if the base table does not contain a single row. Again the predicate P(GRAND_TOTAL_ROW) is used to identify the grand-total row which is always updated and never deleted. Note that a complex grouping expression can generate other groups in addition to the grand total row. Hence, this property must be checked during runtime. If the complex grouping expression does not generate the grand total row, the predicate is omitted.

```
If (not isnull(τ.C_OLD))
    If (δ.C_NEW>0)
    UPDATE τ
    SET
        τ.C=δ.C_NEW,
        τ.S=δ.S_NEW
    WHERE P(GRAND_TOTAL_ROW)
        // is omitted if the grouping expression does not
        // generate the grand total
    End
    If (δ.C_NEW==0)
    DELETE
    FROM τ
    WHERE NOT(P(GRAND_TOTAL_ROW_))
        // is omitted it the grouping expression does not
        // generate the grand total.
    End
End
```

The above logic is performed by steps 818 and 820 of FIG. 8.

Apply Configuration for a Base Table UPDATE Operation

Since an update operation on the underlying base table(s) can be treated as a combination of a delete and an insert operation on the underlying base table(s). The specific requirements for the supporting insertions and deletions for summary tables with complex grouping expressions is described in the two preceding sections.

```
If (isnull(τ.C_OLD)) then
    INSERT INTO τ
    VALUES(τ.C=δ.C_NEW, τ.S=δ.S_NEW)
else
    If (δ.C_NEW>0)
    UPDATE τ
    SET
        τ.C=δ.C_NEW,
        τ.S=δ.S_NEW
    WHERE P(GRAND_TOTAL_ROW)
        // is omitted if the grouping expression does not
        // generate the grand total
    End
    If (δ.C_NEW==0)
    DELETE
    FROM τ
    WHERE NOT(P(GRAND_TOTAL_ROW))
        // is omitted if the grouping expression does not
        // generate the grand total.
    End
End
```

The above logic is performed by steps 918, 920 and 922 of FIG. 9.

MODIFICATIONS AND ENHANCEMENTS

Now that the invention has been described by reference to the preferred embodiment many modifications and variations will become apparent to those of skill in the art in light of the above teaching. Some alternative embodiments include for example, any type of computer, such as a mainframe, minicomputer, or personal computer, could be used with the present invention. In addition, any software program adhering (either partially or entirely) to the relational paradigm could benefit from the present invention.

The foregoing description of the preferred embodiment of the invention has been presented for the purposes of illustration and description. It is not intended to be exhaustive or to limit the invention to the precise form disclosed.

What is claimed is:

1. A computer-implemented method of incrementally maintaining a materialized view with complex grouping expressions derived from at least one base table in a database stored on the computer, the method comprising:

performing a modification to at least one base table in a transaction; and building a data stream comprising modifications to be incrementally propagated to the materialized view with complex grouping expressions.

2. The method of claim 1 wherein the modifications comprise deltas.

3. The method of claim 1 further comprising applying the modifications to the materialized view.

4. The method of claim 1 wherein the building further comprises:

i) when the original modification is an update
    (a) adding a tag column to distinguish data values before and after the modification;
    (b) aggregating the data stream according to the complex grouping expression of the materialized view extended with the tag column;
    (c) multiplying aggregate values resulting from (b) with a value of the tag column; and
    (d) reaggregating the data stream over all grouping columns and all grouping function columns, replacing the aggregation functions with their corresponding refresh functions;

ii) when the original modification is an insertion or a deletion aggregating the data stream according to the complex grouping expression of the materialized view.

5. The method of claim 3 wherein the applying further comprises:

(a) pairing the data stream with the content of the materialized view;
  (b) adjusting the aggregation functions to compute the new aggregate values; and
  (c) modifying a summary table.

6. The method of claim 5 wherein the pairing is performed with a left-outer-join with a predicate ranging over all grouping columns and grouping function columns of the materialized view.

7. The method of claim 5 wherein the adjusting compensates for aggregate functions that return NULL when their input is empty.

8. The method of claim 5 wherein the modifying of the summary table preserves the record for the grand total row.

9. The method of claim 1 wherein the building further comprises incorporating modifications due to enforcement of database semantics.

10. The method of claim 9 wherein the semantics include referential integrity constraints.

11. The method of claim 9 wherein the semantics include triggers.

12. The method of claim 1 wherein the building further comprises:
adding a tag column to distinguish data values before and after the modification; and
incorporating modifications due to enforcement of database semantics.

13. The method of claim 12 wherein the semantics include referential integrity constraints.

14. The method of claim 12 wherein the semantics include triggers.

15. A computer-implemented method of incrementally maintaining a materialized view with complex grouping expressions derived from at least one base table in a database stored on the computer, the method comprising:
performing a modification to at least one base table in a transaction;
building a data stream comprising modifications to be incrementally propagated to the materialized view with complex grouping expressions, said modifications including deltas due to enforcement of database semantics; and
applying the modifications to the materialized view with complex grouping expressions by pairing the data stream with the content of the materialized view, adjusting the aggregation functions to compute new aggregate values, and modifying a summary table.

16. A computer program product including computer executable program instructions tangibly instantiated on a computer readable medium, said program instructions comprising:
first program code for building a data stream comprising modifications to be incrementally propagated to the materialized view with complex grouping expressions;
second program code for building a data stream comprising modifications to be incrementally propagated to the materialized view with complex grouping expressions, said modifications including deltas due to enforcement of database semantics; and
third program code for applying the modifications to the materialized view by pairing the data stream with the content of the materialized view, adjusting the aggregation functions to compute new aggregate values, and modifying a summary table.

17. The computer program product of claim 16 wherein the pairing is performed with a left-outer-join with a predicate ranging over all grouping columns and grouping function columns of the materialized view.

18. The computer program product of claim 17 wherein the second program code comprises the instructions for incorporating modifications due to enforcement of database semantics.

19. A system for incrementally maintaining a materialized view with complex grouping expressions derived from at least one base table in a database stored on a computer, comprising:
means for performing a modification to at least one base table in a transaction;
means for building a data stream comprising modifications to be incrementally propagated to the materialized view with complex grouping expressions, said modifications including deltas due to enforcement of database semantics; and
means for applying the modifications to the materialized view by pairing the data stream with the content of the materialized view, adjusting the aggregation functions to compute new aggregate values, and modifying a summary table.

* * * * *